United States Patent
Vaught

(10) Patent No.: US 7,602,725 B2
(45) Date of Patent: Oct. 13, 2009

(54) SYSTEM AND METHOD FOR AGGREGATING REAL-TIME AND HISTORICAL DATA

(75) Inventor: Jeffrey A. Vaught, Batavia, OH (US)

(73) Assignee: Computer Associates Think, Inc., Islandia, NY (US)

( * ) Notice: Subject to any disclaimer, the term of this patent is extended or adjusted under 35 U.S.C. 154(b) by 742 days.

(21) Appl. No.: 10/886,972

(22) Filed: Jul. 8, 2004

(65) Prior Publication Data

US 2005/0010660 A1 Jan. 13, 2005

Related U.S. Application Data

(60) Provisional application No. 60/486,830, filed on Jul. 11, 2003.

(51) Int. Cl.
*G01R 31/08* (2006.01)
(52) U.S. Cl. ............ 370/236.2; 370/400; 709/224
(58) Field of Classification Search ............ 709/223, 709/224; 370/236.2, 400
See application file for complete search history.

(56) References Cited

U.S. PATENT DOCUMENTS

| 4,843,575 | A | 6/1989 | Crane |
| 6,243,105 | B1 | 6/2001 | Hoyer et al. |
| 6,356,205 | B1 | 3/2002 | Salvo et al. |
| 6,606,304 | B1 | 8/2003 | Grinter et al. |
| 2002/0049838 | A1 | 4/2002 | Sylor et al. |
| 2002/0198984 | A1* | 12/2002 | Goldstein et al. ......... 709/224 |
| 2003/0120593 | A1* | 6/2003 | Bansal et al. ............. 705/39 |
| 2003/0145072 | A1* | 7/2003 | Lau et al. ................ 709/223 |
| 2004/0137915 | A1* | 7/2004 | Diener et al. ........... 455/456.1 |
| 2006/0218651 | A1* | 9/2006 | Ginter et al. ............ 726/27 |

FOREIGN PATENT DOCUMENTS

| EP | 1 043 871 A2 | 10/2000 |
| WO | WO 96/24210 | 8/1996 |
| WO | WO 00/75788 | 12/2000 |
| WO | WO 01/88731 | 11/2001 |

OTHER PUBLICATIONS

Wolfson, Ouri, et al., "*Managing Communication Networks by Monitoring Databases,*" IEEE Transactions on Software Engineering, New York, US; vol. 17, No. 9; Sep. 17, 1991; pp. 944-953.
Notification of Transmittal of the International Search Report and the Written Opinion of the International Searching Authority, or the Declaration—Form PCT/ISA/220 (3 pages); PCT International Search Report—Form PCT/ISA/210 (4 pages), and Written Opinion of the International Searching Authority—Form PCT/ISA/237 (5 pages), PCT/US2004/021902, mailed Nov. 23, 2004.

* cited by examiner

*Primary Examiner*—Seema S Rao
*Assistant Examiner*—Sai-Ming Chan
(74) *Attorney, Agent, or Firm*—Pillsbury Winthrop Shaw Pittman LLP

(57) ABSTRACT

A method and system for aggregating data in an enterprise network are provided. In one embodiment, a method for processing data in an enterprise network includes receiving real-time network performance data associated with a network resource. A database is updated with the real-time network performance data. The database table includes historical network performance data associated with the real-time network performance data.

21 Claims, 3 Drawing Sheets

# SYSTEM AND METHOD FOR AGGREGATING REAL-TIME AND HISTORICAL DATA

RELATED APPLICATION

This application claims the priority under 35 U.S.C. §119 of provisional application Ser. No. 60/486,830 filed Jul. 11, 2003.

TECHNICAL FIELD

This disclosure relates generally to network resources, and more particularly to a system and method for aggregating real-time and historical data.

BACKGROUND

Communication networks rapidly convey large amounts of information typically in the form of frames or packets between remote points. Such networks may include a number of components such as switches, bridges, routers, computers, printers, servers, databases, or other such devices for providing resources over networks. Analysis of performance data associated with network resources have become helpful to facilitate the management of network resources especially as they have grown in size. Based on conventional processing speed and space, real-time and historical data are typically stored in separate repositories.

SUMMARY

A method and system for aggregating real-time and historical data in an enterprise network are provided. In one embodiment, the method includes receiving real-time network performance data associated with a network resource. A database is updated with the real-time network performance data. The database table includes historical network performance data associated with the real-time network performance data. The details of one or more embodiments of the disclosure are set forth in the accompanying drawings and the description below. Other features, objects, and advantages of the disclosure will be apparent from the description and drawings and from the claims.

DETAILED DESCRIPTION

Figure 1:
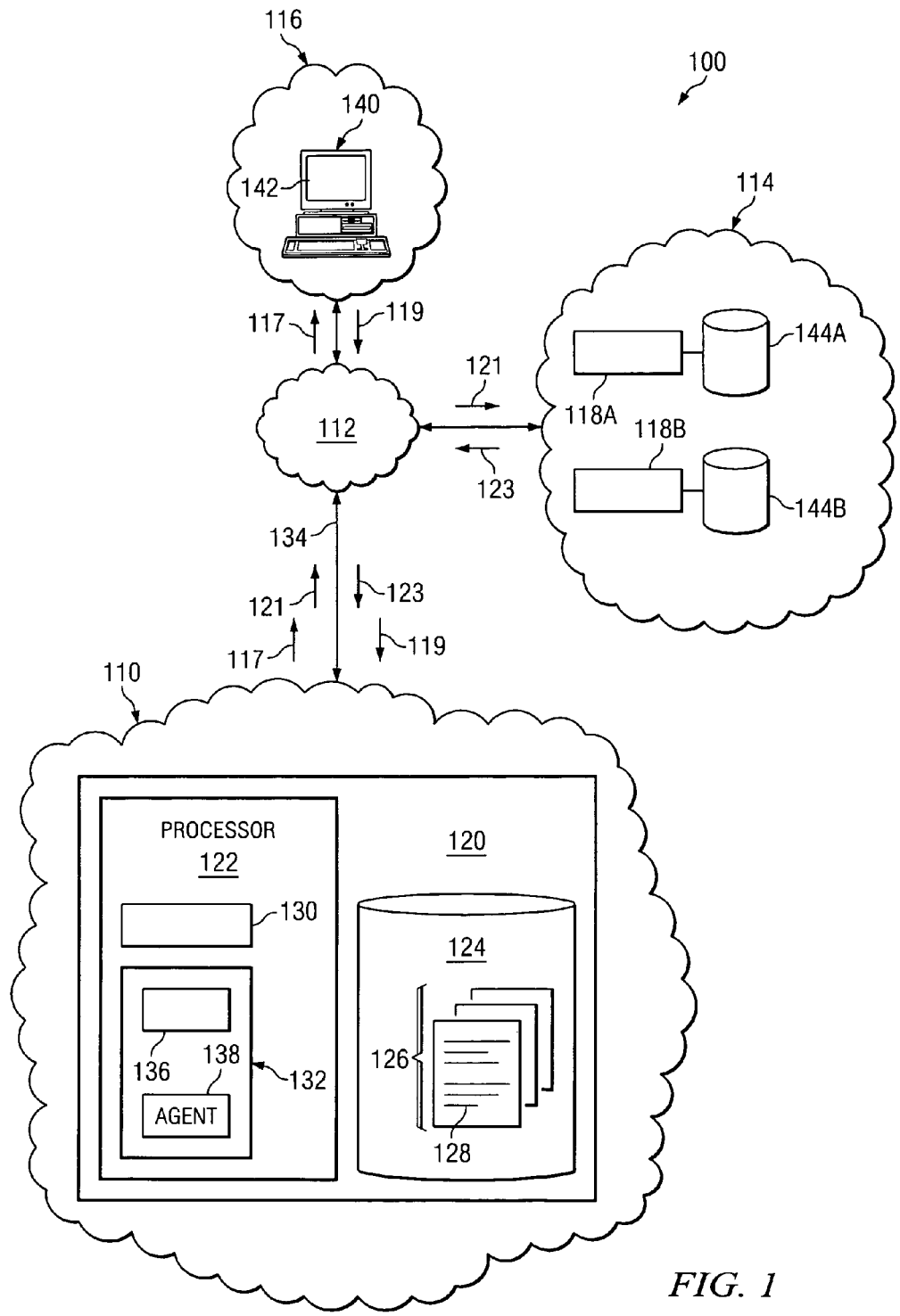
FIG. 1 is a block diagram illustrates an exemplary communication system including a storage system in accordance with one embodiment of the present disclosure.

FIG. 1 illustrates one embodiment of a communication system 100 that uses a storage system 110 to gather, retrieve, or otherwise collect and aggregate real-time and historical network performance data in an enterprise network. At a high level, communication system 100 includes storage system 110, a network 112, a resource system 114, and a request system 116, such that systems 110, 114, and 116 are communicably coupled via or within network 112. In one embodiment, system 100 is an enterprise environment for storing, monitoring, and aggregating network performance data associated with network resources 118 in network 112. System 100 retrieves real-time performance data associated with one or more network resources 118 of network 112 and stores the associated performance data in storage system 110. Storage system 110 processes the retrieved performance data associated with the network resources 118 based on a request from request system 116 and generates and transmits a response to request system 116 via network 112.

Network 112 facilitates wireless and/or wireline communication between network devices. For example, network 112 may facilitate wireline communication between stored system 110 and a computer or any other suitable network device. Network 112 may include one or more local area networks (LANs), radio access networks (RANs), metropolitan area networks (MANs), wide area networks (WANs), all or a portion of the global network known as the Internet, and/or any other communication system or systems at one or more locations. Network 112 may communicate, for example, Internet Protocol (IP) packets, Frame Relay frames, Asynchronous Transfer Mode (ATM) cells, voice, video, data, and other suitable information between network addresses.

Resource system 114 provides resources via network 112. In the illustrated embodiment, resource system 114 includes network resources 118 and management information base (MIB) tables 144 associated with each network resource 118. Network resource 118 may include a web application, a web service, a physical device, or any other suitable software or processing component available via network 112. In one embodiment, network resource 118 includes a web service that is a function coupled to request system 116 via simple object access protocol (SOAP) over HTTP. SOAP may also run over TCP, which may utilize message packets composed from eXtensible Markup Language (XML) tags. For example, network resource 118 may be a web application processing insurance claims, an online book store web service providing title/author search functionality, an online HR web application retrieving and displaying management hierarchy, and many others. Network resources 118 may be operable to receive requests, such as resource requests 121, and transmit responses, such as resource responses 123. In the illustrated embodiment, resource requests 121 may include requests for performance data and/or administrative commands. Performance data, as used herein, generally means data associated with the performance of a network resource 118. Resource response 123 may include real-time performance data, historical performance data, static data, or any other suitable data associated with network resource 118. As used herein, real-time performance data means performance data that is associated with a time varying parameter. The real-time performance data may be stored at network resource 118 or transmitted to storage system 110 as it is generated by network resource 118. Historical performance data means data at least partially preceding real-time performance data, but both may be received simultaneously. Each network resource 118 may be associated with an MIB table 144, where the associated MIB table 144 can store certain attributes of the network resource 118. For example, attributes may include poll intervals, poll methods, status, reason, or any other suitable variables that may be in use by the associated network resource 118.

Request system 116 is operable to transmit requests to a selected network resource 118. The transmitted request may include a request for performance data associated with the selected network resource 118. In one embodiment, the performance data is stored in storage system 110. While requests system 116 is illustrated as disparate from network 112, network 112 may include request system 116. Request system 116 may comprise any number of networked devices operable to request performance data associated with a network resource 118 via network 112. For example, request system 116 may comprise any number of client workstations 140.

Client 140 may include input devices, output devices, mass storage media, processors, memory, interfaces, communication ports, or other appropriate components for communicating client requests 119 to storage system 110 and receiving responses via network 112, such as client responses 112. In the illustrated embodiment, client request 119 may include a request for aggregated performance data associated with a network resource 118 and client responses 117 may include aggregated data associated with a network resource 118. It will be understood that there may be any number of clients 140 coupled to storage system 110. As used in this document, client 140 is intended to encompass a personal computer, workstation, network computer, kiosk, wireless data port, personal data assistants (PDA), one or more processors within these or other devices, or any other suitable processing device. FIG. 1 only provides one example of computers that may be used with the disclosure. The present disclosure contemplates computers other than general purpose computers as well as computers without conventional operating systems. As used in this document, the term computer is intended to include a personal computer, a workstation, network computer, or any other suitable processing device. Moreover, "client 140" and "user of client 140" may be used interchangeably without departing from the scope of this disclosure. For example, client 140 may comprise a computer that includes an input device, such as a keypad, touch screen, mouse, or other device that can accept information and an output device that conveys information associated with the operation of system 100, including digital data, visual information, or any other suitable information. Both the input device and output device may include fixed or removable storage media such as a magnetic computer disk, CD-ROM, or other suitable media to both receive input from and provide output to users of client 140 through a portion of a data display, namely graphical user interface (GUI) 142.

GUI 142 comprises a graphical user interface operable to allow the user of client 140 to interface with system 100 to receive data from storage system 110. Generally, GUI 142 provides the user of client 140 with an efficient and user-friendly presentation of data provided by system 100, such as charts and tables. GUI 142 may comprise a plurality of displays having interactive fields, pull-down lists, and buttons operated by the user. In one embodiment, GUI 142 presents multiple tables according to requests by client 140. It should be understood that the term graphical user interface may be used in the singular or in the plural to describe one or more graphical user interfaces in each of the displays of a graphical user interface. Further, GUI 142 contemplates any graphical user interface, such as a generic web browser, that processes information in system 100 and efficiently presents the information to the user.

Storage system 110 is operable to receive, store, and process traffic from network 112 and transmit responses to client requests 119 from request system 116 and administrative commands 121 to resource system 114. While storage system 110 is illustrated as disparate from network 112, network 112 may include storage system 110 without departing from the scope of the disclosure. Storage system 110 may comprise a plurality of network devices operable to store real-time and historical performance data associated with resource system 114 via network 112. In one embodiment, real-time and historical data are stored in the same database. In certain embodiments, storage system 110 includes, references, or is associated with server 120.

Server 120 includes at least one processor 122 and a database 124 and generally comprises an electronic computing device operable to receive, transmit, process, and store data associated with system 100. For example, server 120 may comprise a general-purpose personal computer (PC), a Macintosh, a workstation, a UNIX-based computer, a server computer, or any other suitable device. According to one embodiment, server 120 may comprise a web server. In short, server 120 may comprise software and/or hardware in any combination suitable to store real-time and historical performance data generated by any portion of resource system 114. For example, if resource system 114 comprises web services, then server 120 may provide capacity planning, usage measurement and usage billing, performance and health reporting, management tools/utilities, or any other suitable functions for utilizing real-time and historical performance data. Indeed, although FIG. 1 provides one example of server 120 that may be used with the disclosure, server 120 may be implemented using computers other than servers, as well as a server pool. Server 120 may be adapted to execute any operating system including UNIX, Linux, Windows, or any other suitable operating system.

Database 124 comprises any storage media for the storage and retrieval of information. According to one embodiment, database 124 may comprise a relational database, typically accessed through structured query language (SQL) statements. Relational databases use sets of schemas to describe the tables, columns, and relationships in the tables using basic principles known in the field of database design. Database 124 may also comprise XML documents, Btrieve files, flat files, and/or comma-separated-value (CSV) files, so long as database 124 includes a plurality of records 126 or other similar data structures or objects.

Generally, each record 126 is one or more managed objects 128 of any appropriate data type, including float, integer, currency, date, decimal, string, or any other numeric or non-numeric format. In one embodiment, each record 126 includes a time identifier and at least one managed object 128. The time identifier identifies the time at which a managed object 128 was generated by a network resource 118, such as, for example, a time and/or date stamp. Managed object 128 may include data associated with an MIB object of a network resource 118. MIB objects are a sequence of numbers that describes network performance information that is stored in resource system 114. Each managed object 128 may include one or more application metrics such as the following: load time for specified assemblies, modules, and classes, load count of specified assemblies, modules, and classes, load failures for specified classes, Just-in-time (Jit) compile time for specified functions, Jit search time for specified functions, Jit count for specified functions, Jit compile failures for specified functions, function execution time for specified functions, function exceptions for specified functions, function interop boundary crossings for specified functions, restart request, CPU load, free system memory, request errors, response time, or any other suitable metrics.

Processor 122 executes instructions and manipulates data to perform operations of server 120. Although FIG. 1 illustrates a single processor 122 in server 120, multiple processors 122 may be used according to particular needs, and references to processor 122 is meant to include multiple processors 122 where applicable. In the illustrated embodiment, processor 122 executes or communicates with a network interface 130 and a network monitoring engine 132. Network interface 130 may facilitate communication with resource system 114 and request system 116 in network 112. In certain embodiments, server 120 may generate a request to at least one of the network resources 118 in network 112 for real-time performance data associated with the at least one of the network resources 118. Interface 130 calibrates the transmission of these requests and the reception of responses to these requests. Generally, interface 130 comprises logic encoded in software and/or hardware in a suitable combination and operable to communicate with network 112 via a link 134. More specifically, interface 130 may comprise software supporting one or more communications protocols associated with link 134 and network 112 hardware operable to communicate physical signals.

Network monitoring engine 132 may process performance data associated with network resources 118 and transmit responses to request system 116 or transmit updated statuses to resource system 114. In the illustrated embodiment, network monitoring engine 132 includes a reporting tool 136 and an agent 138. Agent 138 comprises any component or module operable to monitor information associated with one or more network resources 118 in network 112. In one embodiment, agent 138 may be operable to monitor real-time performance data associated with an associated network resource 118, compare the real-time performance data to a threshold value, and transmit updated statuses based, for example, on a violation of the threshold value. Server 120 may use simple network management protocol (SNMP) to monitor and update MIB objects of resource system 114. SNMP is encoded in protocol data units (PDUs) and sent to the SNMP agent layer over a TCP/IP. Agent 138 may transmit SNMP put commands to the agent layer of a network resource 118. Alternatively, agent 138 may be included in network resources 118. In this case, agent 138 queries storage system 110 to determine threshold violations and provide alerts. In one embodiment, agent 138 compares performance data associated with a network resource 118 to an associated threshold value. In response to the associated information violating the threshold value, agent 138 automatically communicates an SNMP put command to resource system 114 via network 112. The term "automatically," as used herein, generally means that the appropriate processing is substantially performed by server 120. For example, if the response time of a URL exceeds a threshold time limit, then an alert may be communicated to the corresponding network resource 118 without substantial user intervention.

Reporting tool 136 is operable to generate responses 140 for request system 116. In one embodiment, reporting tool 136 receives and decodes a request 119 for performance data associated with a selected network resource 118 and aggregates performance data. Aggregating data may include grouping data into sets, truncating data, parsing data, selecting periodic data sets, summing data, or performing any other appropriate mathematical or algorithmic operation on data. Reporting tool 136 typically associates an aggregation factor to the request from request system 116. The aggregation factor may enables reporting tool 136 to associate an operation to be performed on the requested data with a client request 119. The aggregation factor may include a time interval such that request system 116 is requesting performance data incremented by the time interval. For example, the time interval may be seconds, minutes, hours, days, or other appropriate intervals. In this embodiment, reporting tool 136 retrieves a portion of the plurality of records 126 associated with the selected network resource 118. Based upon the aggregation factor, managed objects 128 are aggregated in sets such that corresponding time identifiers of the set span the time interval. At which point, reporting tool 136 generates a new time identifier associated with each aggregated set of data. The reporting tool 136 repeats this process until the portion of the plurality records 126 has been exhausted. Reporting tool 136 transmits a client response 117 to the client request 119 including the aggregated data. For example, reporting tool 136 may provide table in table detail associated with an application containing several URLs. Reporting tool 136 may provide one or more of the following tables: problem report indicating the number of threshold violations, list of critical URLs or the application, response time report indicating why a response time is critical, Common Language Runtime (CLR) problem report including class load failure and Just-in-time compile failures, customer problem report including a list of critical customers, customer detail report including critical applications and web services by customer, or other suitable tables. The aggregated data may be in any electronic format such as, for example, an XML document, flat files, HTML files, Btrieve files, CSV files, SQL tables or any other suitable format.

In one aspect of operation, server 120 receives real-time performance data from network devices 118 and stores the performance data in database 124. Agent 138 monitors real-time performance data against one or more threshold values retrieved from network resources 118. Once agent 138 determines that the real-time data violates a threshold value, agent 138 transmits a command to the violating network resource 118 to update the status of the corresponding MIB object stored in MIB table 144. In another aspect of operation, client 140 transmits a request 119 for performance data associated with a selected network device 118. Server 120 receives and decodes request 119 from client 140 and associates the request with an aggregation factor. Reporting tool 136 retrieves a portion of the plurality of records 126 associated with the selected network device network resource 118. Reporting tool 136 groups, associates, or otherwise aggregates the portion of the plurality of records 126 into sets such that the time identifiers of each set spans the aggregation factor. In one embodiment, the time identifiers span a time interval. Managed objects 128 of each set of records are then associated with a new time identifier. Once the reporting tool aggregates the appropriate portion of the plurality of records 126 associated with the selected network resource 118, reporting tool 136 transmits the aggregated data to client 140 via network 112. Client 140 receives the aggregated data and constructs graphical elements displayed via GUI 142 to represent the aggregated data accordingly. Of course, client 140 may also receive web pages, generated by server 102 using the aggregated data, for display in GUI 142.

Figure 2:
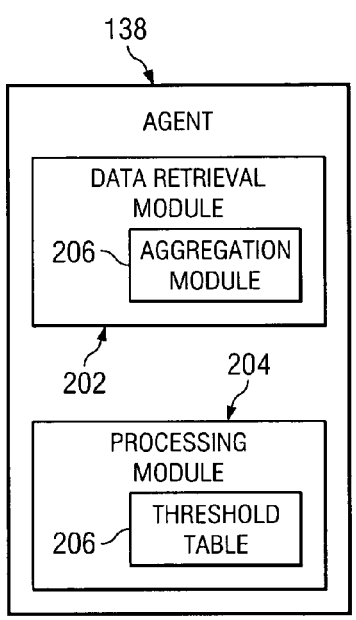
FIG. 2 is an exemplary diagram illustrating an example agent referred to in FIG. 1.

FIG. 2 illustrates one embodiment of implementing agent 138 of system 100. In the illustrated embodiment, agent 138 includes a data retrieval module 202 and a processing module 204. Data retrieval module 202 is operable to receive requests 119 from client 140 and generate messages to database 124 in order to retrieve performance data associated with a network resource 118. Further, data retrieval module 202 may be operable to aggregate data via aggregation module 206. As discussed above, aggregation module 206 may associate request 119 from client 140 with an aggregation factor. Aggregation module 206 selects a subset of retrieved records 126 from database 124 based on the aggregation factor. In one embodiment, the aggregation factor comprises or identifies a mathematical operation to be performed on the associated performance data. Aggregation module 206 parses out the data suitable for the aggregation factor each record 126 retrieved from database 124 and groups these records 126 according to aggregation factor. At this point, aggregation module 206 aggregates the corresponding managed objects associated with each set. Aggregation module 206 repeats these steps until the retrieved records are suitably aggregated. Data retrieval module 202 then transmits a response to request 119 from client 140 including the aggregated data associated with the selected network resource 118.

Processing module 204 is operable to process real-time performance data associated with network resources 118 as received by server 120. Processing module 204 is further operable to automatically transmit changes in status to a corresponding network resource 118. In the illustrated embodiment, processing module 204 includes threshold table 208. Threshold table 208 comprises a table of threshold values associated with network resources 118. Real-time performance data processed by processing module 204 may compare the performance data to the threshold table 208. In particular, each managed object 128 may be compared to a corresponding threshold value. Processing module 204 may communicate a violation of the threshold value to the corresponding network resource 118. In one embodiment, processing module 204 transmits an SNMP put command such that the put command alters a status stored in an associated MIB table 144 indicating a violation of the threshold value.

Figure 3:
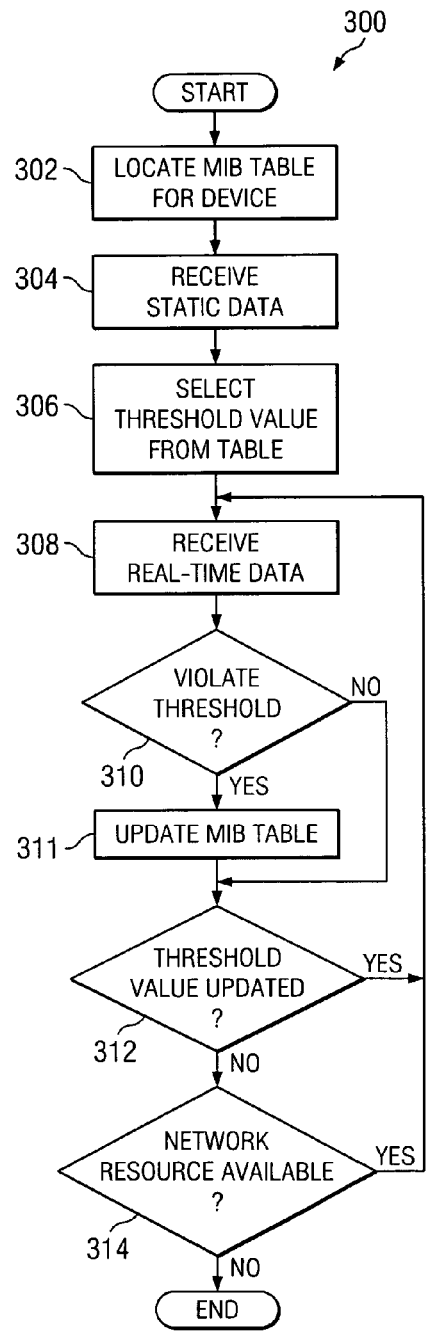
FIG. 3 is an exemplary flow diagram illustrating an example method for monitoring performance data associated with a network resource in accordance with one embodiment of the present disclosure.

FIG. 3 is an exemplary flow diagram illustrating an example method 300 for monitoring real-time performance data of a selected network resource 118 according to one embodiment of this disclosure. Method 300 is described with respect to communication system 100 of FIG. 1, but method 300 could also be used by any other system. Moreover, system 100 may use any other suitable technique for performing these tasks. Thus, many of the steps in this flow chart may take place simultaneously and/or in different orders then as shown. Indeed, system 100 may use methods with additional steps, fewer steps, and/or different steps, so long as the methods remain appropriate.

Method 300 begins at step 302, where server 120 receives static data from a network resource 118. In one embodiment, static data may include threshold values associated with MIB objects or any other information associated with the network resource 118. At step 304, server 120 locates an MIB table 144 associated with the particular network resource 118. Agent 138 identifies or otherwise selects threshold values from database 124 associated with network resource 118 at step 306. Next, at step 308, server 120 receives real-time data associated with network resource 118. At decisional step 310, agent 138 determines if the real-time performance data violates any corresponding threshold value associated with network resource 118. If agent 138 determines that a threshold value has been violated, then agent 138 transmits a command to update an MIB object stored in the associated MIB table 144 to indicate a violation of threshold value. If agent 138 determines that the threshold value has not been violated, then execution proceeds to decisional step 312. At decisional step 312, agent 138 determines if any threshold value associated with network resource 118 has been updated. If the threshold value has been updated at network resource 118, then threshold value stored in database 124 is updated and method 300 returns to step 308. If the threshold value of the network resource 118 has not been updated, then method 300 proceeds to decisional step 314. At decisional step 314, network monitoring engine 132 determines if network resource 118 is still available via network 112. If network resource 118 is still available then execution returns to step 308. If the network resource 118 is not available via network 112, then execution ends.

Figure 4:
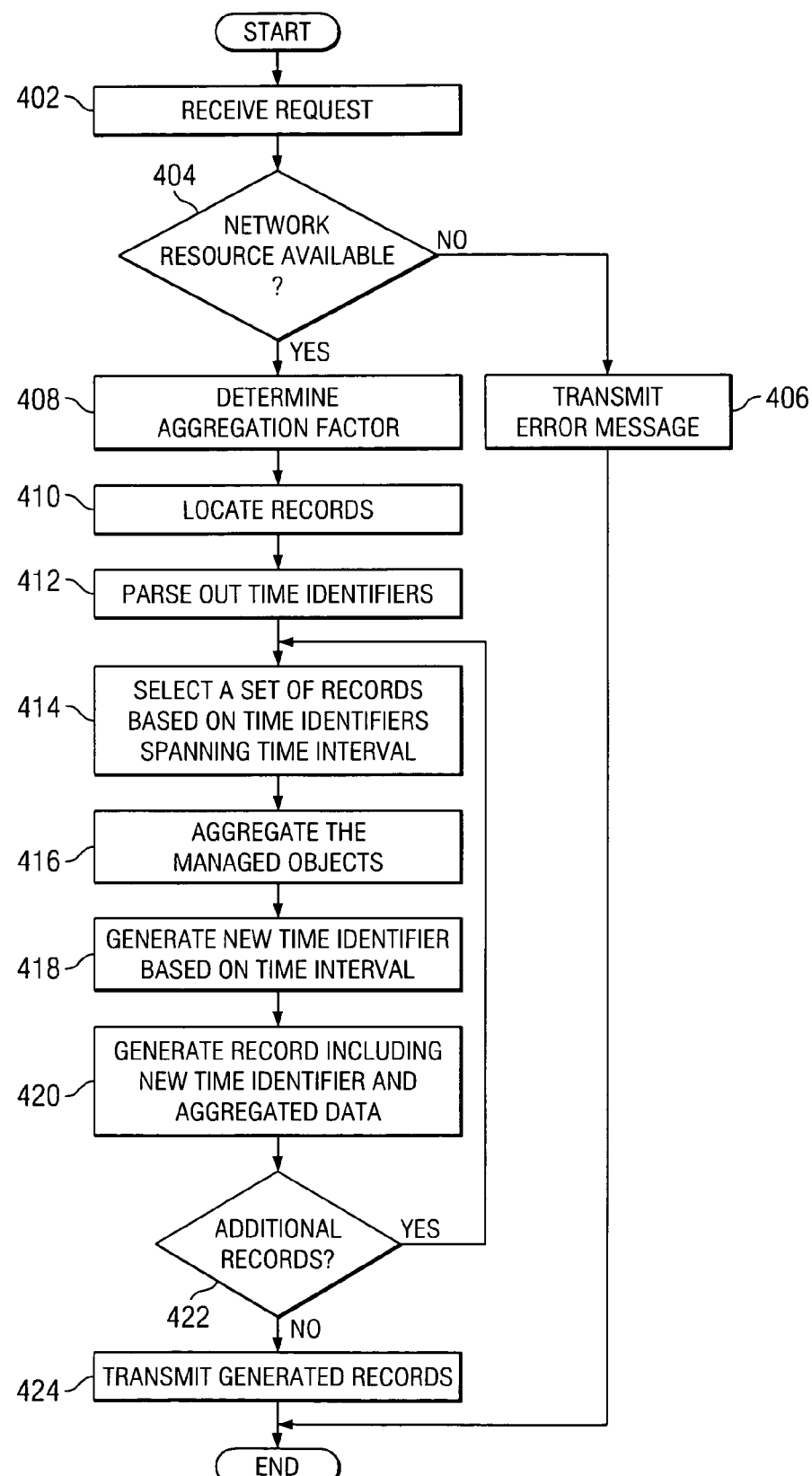
FIG. 4 is an exemplary flow diagram illustrating an example method for processing performance data associated with a network resource upon request in accordance with one embodiment of the present disclosure.

FIG. 4 is an exemplary flow diagram illustrating an example method 400 for aggregating performance data associated with a selected network resource 118 based upon a request from a client 140 according to one embodiment of this disclosure. Method 400 is described with respect to communication system 100 of FIG. 1, but method 400 could be used by any other system. As with method 300, system 100 may use any other suitable technique for performing these tasks. Thus, many of the steps in this flow chart may take place simultaneously and/or in different orders then as shown. Moreover, system 100 may use methods with additional steps, fewer steps, and/or different steps so long as the methods remain appropriate.

Method 400 begins at step 402, where server 120 receives a request 119 from client 140 via network 112. At decisional step 404, network monitoring engine 132 determines whether performance data is available for a network resource 118. If the network resource 118 is not available, an error message is transmitted by server 120 to client 140 via network 112 at step 406 and processing ends. If performance data is available for the selected network resource 118, execution proceeds to step 408. At step 410, reporting tool 136 locates a portion of the plurality of records 126 stored in database 124 based upon the request from client 140. Next, at step 412, reporting tool 136 parses out time identifiers of the portion of the plurality of records 126. Reporting tool 136 selects a set of records based on the time identifiers spanning the time interval at step 414. Next, at step 416, reporting tool 136 aggregates the managed objects of each record in the set of records according to an aggregation factor. Based on a time interval of the aggregation factor, reporting tool 136 generates a new identifier associated with the aggregated managed objects at step 418. For example, reporting tool 136 may truncate a time identifier representing seconds into a new identifier representing minutes. Next, at step 420, reporting tool 136 generates a record including the new time identifier and the aggregated data. At decisional step 422, reporting tool 136 determines whether there are additional records to separate into sets and aggregate corresponding data. If there are additional records, execution returns to step 414. If reporting tool 136 determines that there are no further records to be aggregated, reporting tool 136 transmits the aggregated records generated by the reporting tool 136 at step 424.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for aggregating real-time and historical data in an enterprise network having a plurality of network resources, comprising:

receiving, by one or more processors of a server, real-time network performance data associated with a particular network resource among the plurality of network resources;

updating, by the one or more processors of the server, a database table with the real-time network performance data, the database table comprising historical network performance data associated with the particular network resource, wherein the database table comprises a plurality of records that represent the real-time network performance data and the historical network performance data; and in response to a request to access a network performance of the particular network resource, the request comprising an aggregation factor that is used to group at least some of the plurality of records and that includes an aggregation time interval:

querying, by the one or more processors of the server, the database table to retrieve, according to the aggregation time interval, a first set of records corresponding to a first time interval within the aggregation time interval and a second set of records corresponding to a second time interval within the aggregation time interval, wherein the first set of records and the second set of records are different from one another, and wherein the first set of records and the second set of records respectively comprise data from one or more records among the plurality of records, aggregating, by the one or more processors of the server, the first set of records for the particular network resource based, at least in part, on the aggregation factor, aggregating, by the one or more processors of the server, the second set of records for the particular network resource based, at least in part, on the aggregation factor, and determining, by the one or more processors of the server, the network performance of the particular network resource based at least in part on the aggregated first set of records and the aggregated second set of records for the particular network resource.

2. The method of claim 1, the network performance data comprising a plurality of Management Information Base (MIB) parameters associated with the particular network resource.

3. The method of claim 2, further comprising:
comparing, by the one or more processors of the server, at least one of the plurality of MIB parameters to an associated threshold value that indicates a threshold for the network performance of the particular network resource has been violated.

4. The method of claim 3, further comprising in response, at least in part, to the at least one of the MIB parameters violating the threshold value, updating, by the one or more processors of the server, a status parameter in an MIB table associated with the particular network resource, wherein the status parameter indicates that the threshold value has been violated.

5. The method of claim 4, said updating, by the one or more processors of the server, a status parameter further comprising:
transmitting, by the one or more processors of the server, a command to an MIB object that manages the MIB table to update the status parameter of the MIB table.

6. The method of claim 1, wherein each record among the plurality of records comprises a time identifier and at least one managed object.

7. The method of claim 6, further comprising:
converting, by the one or more processors of the server, the time identifier for each record among the aggregated first set of records into a first new time identifier having a different unit of time than the time identifier; and
converting, by the one or more processors of the server, the time identifier for each record among the aggregated second set of records into a second new time identifier having a different unit of time than the time identifier,
wherein the first new time identifier and the second new time identifier are each based on the aggregation time interval.

8. The method of claim 6, wherein said converting, by the one or more processors of the server, the time identifier for each record among the aggregated first set of records into a first new time identifier further comprises:
converting the time identifier that uses a seconds unit of time to the first time identifier that uses a minutes unit of time.

9. The method of claim 1, the aggregation factor comprising a first aggregation factor and the method further comprising aggregating the retrieved data into a second record based, at least in part, on a second aggregation factor, wherein the first aggregation factor is distinct from the second aggregation factor.

10. A computer readable medium storing computer executable instructions for aggregating real-time and historical data in an enterprise system having a plurality of network resources, the instructions configuring one or more processors when executed to:

receive real-time network performance data associated with a particular network resource among the plurality of network resources;

update a database table with the real-time network performance data, the database table comprising historical network performance data associated with the particular network resource, wherein the database table comprises a plurality of records that represent the real-time network performance data and the historical network performance data; and in response to a request to access a network performance of the network resource, the request comprising an aggregation factor that is used to group at least some of the plurality of records and that includes an aggregation time interval:

query the database table to retrieve, according to the aggregation time interval, a first set of records corresponding to a first time interval within the aggregation time interval and a second set of records corresponding to a second time interval within the aggregation time interval, wherein the first set of records and the second set of records are different from one another, and wherein the first set of records and the second set of records respectively comprise data from one or more records among the plurality of records, aggregate, at a server, the first set of records for the particular network resource based, at least in part, on the aggregation factor, aggregate, at the server, the second set of records for the particular network resource into a first set of aggregated data and a second set of aggregated data based, at least in part, on the aggregation factor, and determine the network performance of the particular network resource based at least in part on the aggregated first set of records and the aggregated second set of records for the particular network resource.

11. The computer readable medium of claim 10, the network performance data comprising a plurality of Management Information Base (MIB) parameters associated with the particular network resource.

12. The computer readable medium of claim 11, further operable to compare at least one of the MIB parameters to an associated threshold value that indicates a threshold for the network performance of the particular network resource has been violated.

13. The computer readable medium of claim 12, the instructions further configuring one or more processors when executed to in response, at least in part, to the at least one of the MIB parameters violating the threshold value, update a status parameter in an MIB table associated with the particular network resource, wherein the status parameter indicates that the threshold value has been violated.

14. The computer readable medium of claim 10, wherein each record among the plurality of records comprises a time identifier and at least one managed object.

15. The computer readable medium of claim 14, the instructions further configuring one or more processors when executed to:
- convert the time identifier for each record among the aggregated first set of records into a first new time identifier having a different unit of time than the time identifier; and
- convert the time identifier for each record among the aggregated second set of records into a second new time identifier having a different unit of time than the time identifier,
- wherein the first new time identifier and the second new time identifier are each based on the aggregation time interval.

16. A system for aggregating real-time and historical data in an enterprise system having a plurality of network resources, comprising:
- memory storing a database table comprising historical network performance data for a particular network resource among the plurality of network resources; and
- one or more processors collectively configured to:
  - receive real-time network performance data associated with the particular network resource;
  - update the database table with the real-time network performance data, the database table comprising historical network performance data associated with the particular network resource, wherein the database table comprises a plurality of records that represent the real-time network performance data and the historical network performance data; and
  - in response to a request to access a network performance of the particular network resource, the request comprising an aggregation factor that is used to group at least some of the plurality of records and that includes an aggregation time interval:
    - query the database table to retrieve, according to the aggregation time interval, a first set of records corresponding to a first time interval within the aggregation time interval and a second set of records corresponding to a second time interval within the aggregation time interval, wherein the first set of records and the second set of records are different from one another, and wherein the first set of records and the second set of records respectively comprise data from one or more records among the plurality of records,
    - aggregate, at a server, the first set of records for the particular network resource based, at least in part, on the aggregation factor,
    - aggregate, at the server, the second set of records for the particular network resource based, at least in part, on the aggregation factor, and
    - determine the network performance of the particular network resource based at least in part on the aggregated first set of records and the aggregated second set of records for the particular network resource.

17. The system of claim 16, the network performance data comprising a plurality of Management Information Base (MIB) parameters associated with the particular network resource.

18. The system of claim 17, further operable to compare at least one of the MIB parameters to an associated threshold value that indicates a threshold for the network performance of the particular network resource has been violated.

19. The system of claim 18, the one or more processors further configured to in response, at least in part, to at least one of the MIB parameters violating the threshold value, update a status parameter in an MIB table associated with the particular network resource, wherein the status parameter indicates that the threshold value has been violated.

20. The system of claim 16, wherein each record among the plurality of records comprises a time identifier and at least one managed object.

21. The system of claim 20, the one or more processors further configured to:
- convert the time identifier for each record among the aggregated first set of records into a first new time identifier having a different unit of time than the time identifier; and
- convert the time identifier for each record among the aggregated second set of records into a second new time identifier having a different unit of time than the time identifier,
- wherein the first new time identifier and the second new time identifier are each based on the aggregation time interval.

* * * * *